May 3, 1938. J. S. TRUESDELL 2,115,969
APPARATUS FOR PRODUCING PEANUT COATED CANDIES
Filed Sept. 2, 1936 3 Sheets-Sheet 2
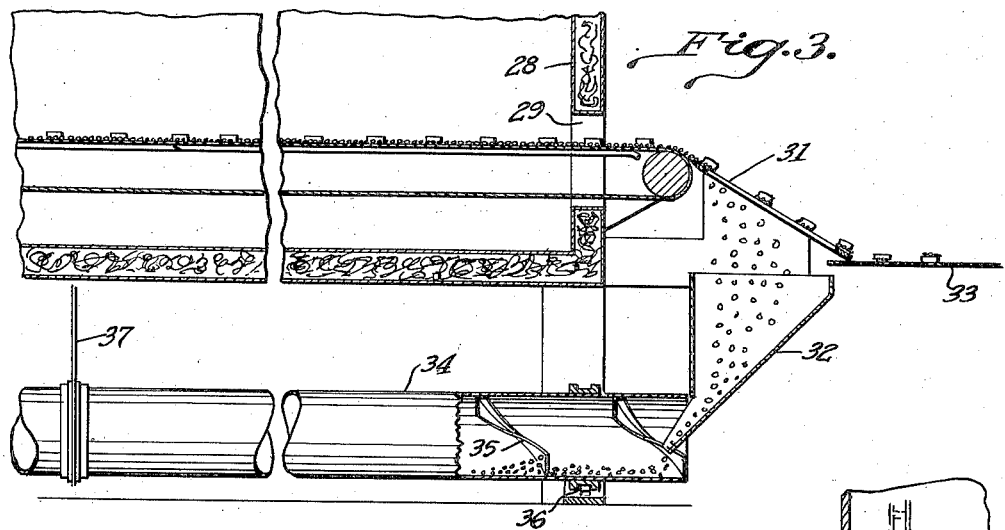
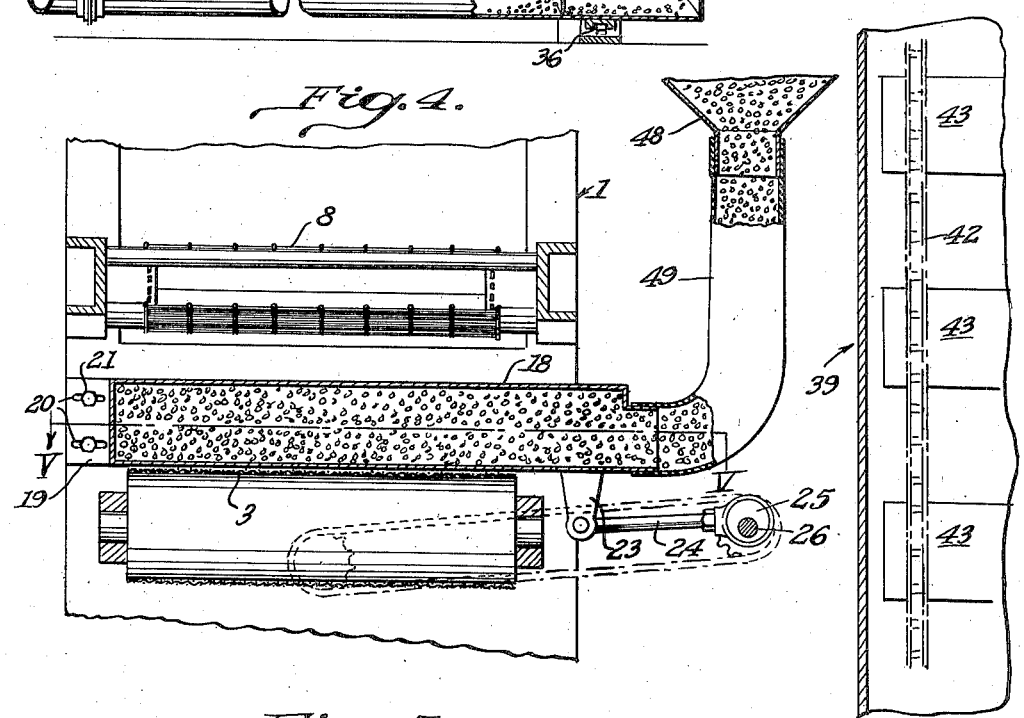
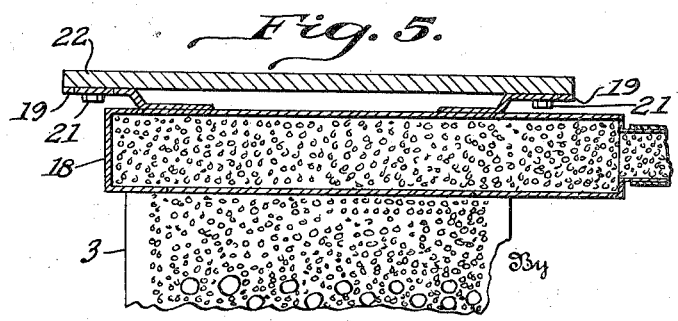
Inventor
John S. Truesdell
W. S. McPowell
Attorney

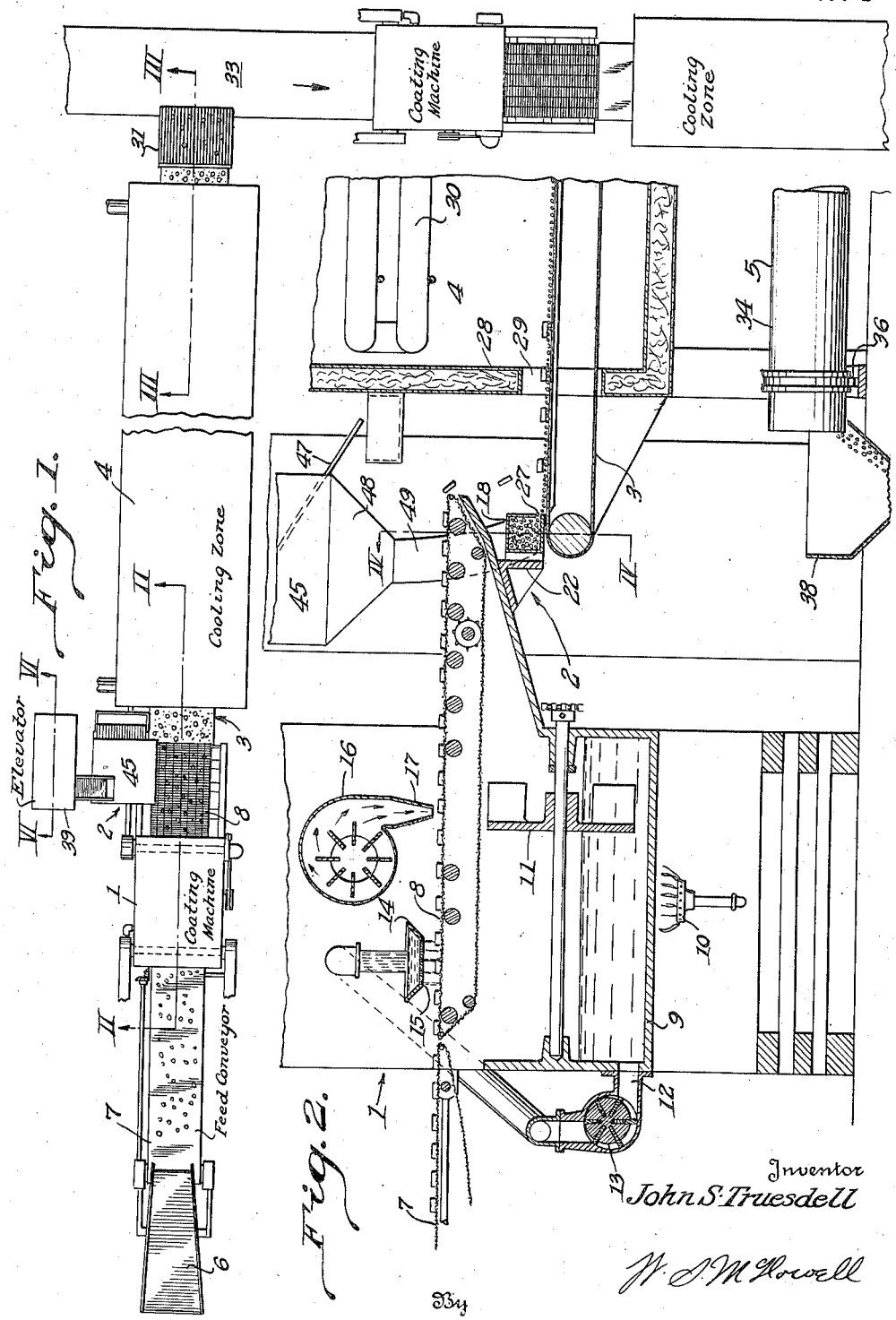

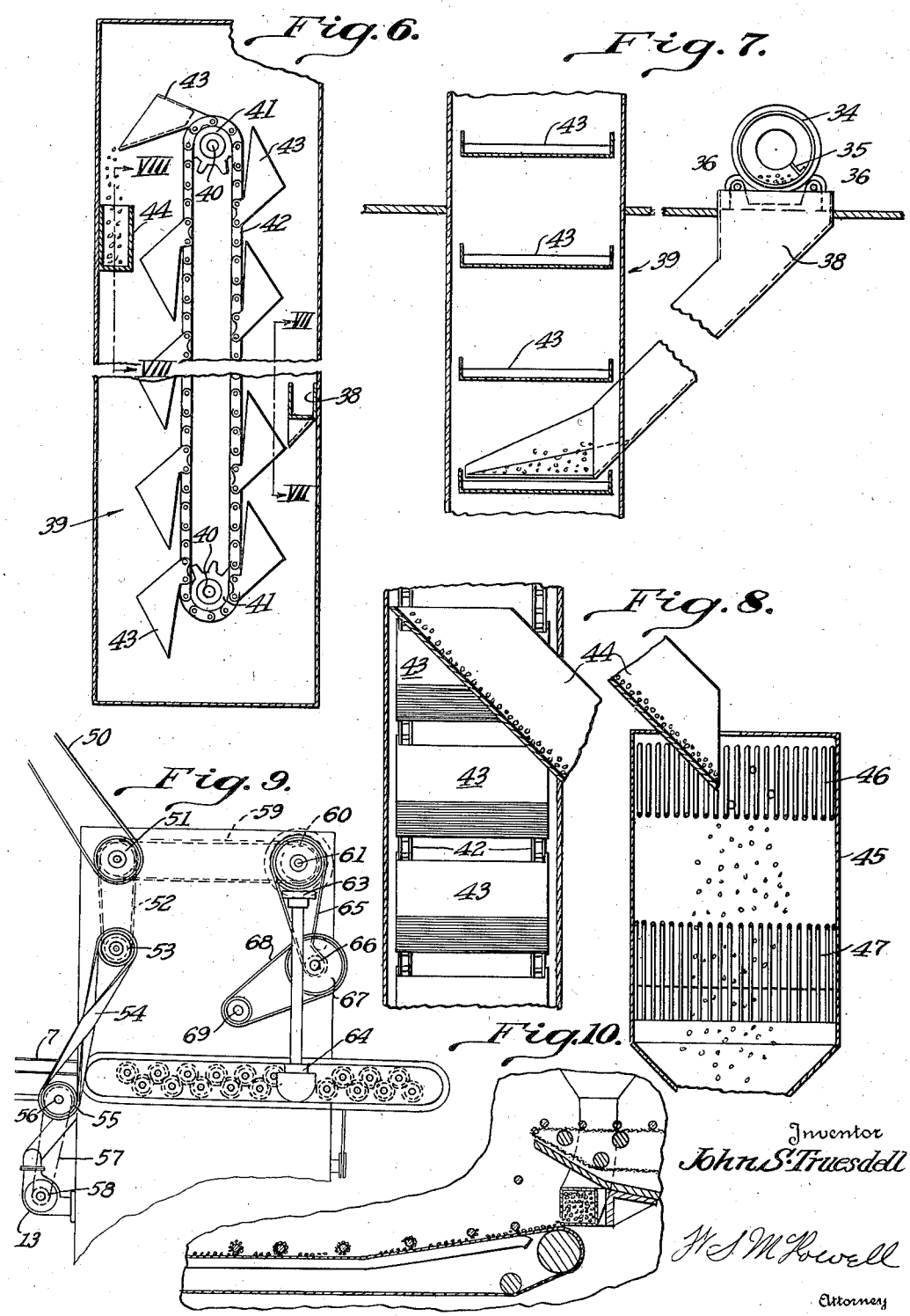

Patented May 3, 1938

2,115,969

UNITED STATES PATENT OFFICE 2,115,969

APPARATUS FOR PRODUCING PEANUT COATED CANDIES

John S. Truesdell, Columbus, Ohio

Application September 2, 1936, Serial No. 99,083

1 Claim. (Cl. 107—1)

This invention relates to an improved apparatus for manufacturing confections of the type wherein edible nuts are applied to a fondant or other candy base.

Generally stated, the objects of the present invention are to provide apparatus for facilitating and expediting the manufacture of confections of the character set forth; to produce such confections without involving slow, costly and laboriously executed hand operations; to provide for the firm adherence of the edible nuts on the candy bases or bodies; to prevent waste or loss of the edible nuts; and to provide for economy in the production of such confections.

In accordance with the present invention, a movable conveyor or belt is provided upon which edible nuts are delivered and distributed in a single layer and wherein associated means are provided for successively dropping relatively soft candy bodies on the layer of nuts contained on and moving in unison with the conveyor, the dropping of the candy bodies on the conveyor serving to embed the nuts in the candy bodies and effect their positive adherence thereto, a further feature of the invention being the return of the unused nuts from the conveyor to the original point of their supply and distribution.

For a further understanding of the invention, reference is to be had to the following description and the accompanying drawings, wherein:

Fig. 1 is a plan view of the apparatus utilized by the present invention;

Fig. 2 is an enlarged vertical sectional view taken through said apparatus on the plane denoted by the line II—II of Fig. 1. In this figure, there is disclosed the apparatus for coating candy bodies or fondants, for effecting the dropping of the coated bodies or fondants on the forming conveyor containing the edible nuts and for cooling the confection so formed.

Fig. 3 is a vertical sectional view on the plane indicated by the line III—III of Fig. 1, and illustrating more particularly the discharge end of the cooling receptacle and the means for returning unused nuts to the original source of supply therefor.

Fig. 4 is a vertical transverse sectional view as indicated by the line IV—IV of Fig. 2, and disclosing the reciprocatory distributor for delivering the edible nuts to the forming conveyor.

Fig. 5 is a horizontal sectional view through said distributor on the line V—V of Fig. 4.

Fig. 6 is a vertical sectional view taken through the nut elevator, the plane of the figure being indicated by the line VI—VI of Fig. 1.

Fig. 7 is a vertical sectional view taken through the elevator on the plane disclosed by the line VII—VII of Fig. 6;

Fig. 8 is a similar view on the plane indicated by the line VIII—VIII of Fig. 6;

Fig. 9 is a side elevation disclosing the driving mechanism for the various units of the apparatus.

Fig. 10 is a vertical section through a modified type of apparatus wherein provision is made to coat the candies on all sides.

Referring more particularly to the drawings, the apparatus utilized by the present invention comprises a coating unit 1, a nut supplying and distributing unit 2, a forming conveyor 3, cooling apparatus 4 and a surplus nut returning mechanism 5, these units or parts operating in conjunction with one another to mechanically and automatically produce nut-containing candy confections hitherto largely produced by hand operations.

As shown in Figs. 1 and 2 of the drawings, a gravity slide or trough 6 delivers previously formed candy bases or fondants of desired size and shape to a horizontal primary conveyor 7, driven and supported by any suitable means. The discharge end of the conveyor 7 enters the casing of the coating unit 1 and closely registers with the receiving end of a secondary conveyor 8, the latter having its advancing run disposed in approximately the same horizontal plane as the corresponding run of the primary conveyor, so that the candy bodies or fondants may be transferred readily from the primary to the secondary conveyors.

While the candy bodies are traveling on the advancing run of the secondary conveyor 8, the same are coated with a candy preparation such, for instance, as a chocolate syrup, which will solidify when at normal room temperatures. The coating syrup is contained within a sump or receptacle 9 formed in the bottom of the coating unit, the syrup ordinarily being maintained in a flowing state by heating the same, as, for instance, through the use of a gas burner as indicated at 10. The receptacle or sump 9 may be provided with a rotating agitator 11 to facilitate the flow of the coating syrup and to insure uniform composition thereof. The heated syrup is withdrawn from the receptacle or sump 9 through an outlet 12 in which is arranged a pump 13, so that the syrup may be elevated to a position above the top run of the belt 8 and deposited in a stationary transversely extending basin 14 arranged within the unit 1, the bottom of the basin 1 being provided with restricted outlets 15 providing for the regulated flow of the coating syrup through said basin and onto the candy bodies or fondants continuously advancing through the coating unit on the upper run of the conveyor 8. A blower 16 is also arranged within the coating unit with its discharge nozzle 17 disposed immediately adjacent to but above the coated candies traveling on the conveyor 8, the said blower serving to deliver blasts of air to the coated candies in order to remove excess coating material therefrom.

The receiving end of the forming conveyor 3 is disposed at a substantial distance below the discharge end of the coating conveyor 8 so that there will be an appreciable drop on the part of the coated candies when being transferred from the coating conveyor to the forming conveyor. This drop of the candies is utilized by the present invention for the purpose of securing firm and positive adherence of edible nuts to the candy bodies. Edible nuts, such as peanuts, almonds or the like, are contained in an elongated distributor 18 arranged horizontally and transversely over the receiving end of the forming conveyor 3, as shown more particularly in Figs. 4 and 5. The back of the distributor 18 carries brackets 19 provided with elongated slots 20 for the reception of securing devices 21 carried in connection with a supporting frame 22. Extending downwardly from the bottom of the distributor is an ear 23, with which is pivotally connected one end of a rod 24, the latter having its opposite end connected with an eccentric 25, rotated by a shaft 26 so that a reciprocating back and forth motion will be imparted to the distributor. This motion enables the nuts contained within the distributor to pass out of the same through an elongated and restricted slot 27 formed in the front of the distributor at the bottom thereof, so that the nuts contained within the distributor will be positively delivered in a single layer on the advancing run of the forming conveyor, and distributed over a desired transverse area of said forming conveyor. Thus the coated candy bodies dropping on this layer of nuts cause the latter to firmly adhere to the candy bodies and become intimately associated therewith to produce a composite article of confection. In accomplishing this result, it will be noted that no handling of the candy confections is necessary.

After the union of the coated candy bases with the edible nuts has been effected, the said confections are advanced by the operation of the forming conveyor into the cooling apparatus indicated at 4. This apparatus may be of any desired form but in the present instance, has been shown as comprising a container having thermally insulated walls 28, the end walls of said container being provided with openings 29 for the passage of the forming conveyor through the cooling zone of the apparatus 4. Within the walls 28, there may be mounted a refrigerating coil 30 in order to artificially lower the temperature within the cooling zone and to hasten the hardening of the coating composition on the candy fondants and the resulting secure union of the edible nuts with the candy bodies.

The discharge end of the forming conveyor, which is disposed exteriorly of the cooling apparatus, as shown in Fig. 3, terminates contiguous to an inclined grid 31 having spaced longitudinally extending bars, the spacing between said bars being such as to permit the unused or surplus nuts, which have not been joined with candy bodies, to drop downwardly through the grid into a receiver 32, so that said surplus nuts may be returned to the original point of supply and waste or loss thereof prevented. The completed candy confections are delivered by the inclined grid 31 to a belt or table 33 and transferred to a packaging station.

The receiver 32 delivers the surplus edible nuts to a rotating tube 34 having the interior walls thereof provided with spiral conveying blades 35. The tube 34 is mounted for rotation in suitable bearings, such as the type indicated at 36, and is rotated by means of a belt shown at 37 in Fig. 3. The tube 34 may be located below the cooling receptacle 4 and has its forward or discharge end disposed above the receiving hopper 38 of an elevator 39. This elevator, as shown in Fig. 6, is provided with power driven shafts 40 carrying sprockets 41. Around these sprockets pass endless chains 42 which are connected with and suitably spaced to receive elevating scoops or buckets 43. These scoops or buckets 43 in passing around the lower set of sprockets engage with the edible nuts delivered into the bottom of the elevator casing by the surplus nut return mechanism or deliberately introduced into the apparatus by a manual operation. The nuts are elevated and following their passage around the upper set of sprockets are discharged into a gravity slide 44 by which the nuts are removed from the top of the elevator casing and, as shown in Figs. 7 and 8, are transferred to a separator 45.

This separator consists of a casing containing upper and lower ends of inclined screens 46 and 47. The spacing of the bars comprising the upper screen is such as to prevent the passage therebetween of large sized bodies which could not be handled by the nut distributor, or which would tend to interfere with the operation of the latter. For instance, should a nut containing candy drop through the grid 31 and be returned by the tube 34 to the source of nut supply, such a candy, being too large to pass through the restricted outlet slot of the distributor 18, will be deflected by the upper screen 46 and removed from the separator. The same action takes place with the use of the lower inclined screen 47 which comprises bars spaced a less distance apart than those of the upper screen and by which bodies of undesirable large size are automatically removed from the apparatus. The nuts of proper size, however, readily drop through the screens 46 and 47 into the bottom of the separator casing and are there funneled as at 48 into the upper end of a flexible conduit 49, which leads to the entrance of the distributor 18. The flexibility of the walls of the conduit 49 permit said distributor to be readily reciprocated for the purposes aforesaid.

Any suitable means may be provided for driving the various conveyors and other movable units of this apparatus. Such drive mechanisms may be individual to each unit or may include a common power shaft and a system of transmission belts and pulleys. In Fig. 9 a belt 50 leading from a pulley provided on a line shaft, not shown, passes around a pulley 51 to drive the latter. A belt 52 is also trained around the pulley 51 and leads to a pulley 53. Passing around the pulley 53 is a crossed belt 54, which drives a pulley 55 mounted on a drive shaft 56 for the primary conveyor 7. Also, mounted on the shaft 56 is a sprocket around which passes an endless chain 57, the latter being employed to drive a sprocket 58 connected with the drive shaft of the pump 13. From the pulley 51, a third belt 59 may extend to a pulley 60 connected with a shaft 61. This shaft may carry bevel gearing indicated at 63 and 64 for driving the coating conveyor and also for driving a belt 65 carried by a shaft 66. A pulley 67 is mounted on the shaft 66 and drives a belt 68 which, in turn, drives a pulley 69 on the operating shaft of the blower 16. It will be understood that similar or independent drive mechanism may be utilized for operating the forming conveyor, the nut elevator 39 and the conveyor tube 34.

In view of the foregoing, it will be seen that the present invention provides an improved automatic apparatus by which nut-containing candy confections may be produced rapidly, economically and in a sanitary manner. Heretofore, in the making of candy confections of the character set forth, it has been customary to apply the edible nuts to the candy body of the confection by manually executed operations. With the present invention, however, the candies are not touched by the hand, yet well formed confections are produced equally as good as the hand made product. This is believed to be mainly attributable to the operation of dropping the relatively soft coated candy body on the layer of nuts contained on the forming belt, and substantially immediately after cooling the confection to solidify or harden the same and to thereby securely unite the edible nuts in the candy body.

It will be observed that the discharge end of the coating machine conveyor 8 is so guided that its return run drops sharply in acute forwardly extending angular relation to the upper run of that conveyor. This is done so that the falling candy bodies will not contact with the conveyor 8 and to permit said candy bodies to have a sharp unimpeded fall into contact with the edible nuts spread over the advancing run of the forming conveyor.

Economy and continuity of operation is also retained by the return of the surplus nuts to the point of supply and the removal of undesired large bodies to avoid clogging the operation of the nut distributor.

It will be understood that in lieu of applying edible nuts to a relatively soft candy body, edible substances other than nuts may be utilized, such for example, as relatively hard candies or the like. If desired, the forward or receiving portion of the forming conveyor may be inclined to the horizontal so that the candy bodies dropping on the movable bed of edible nuts contained on the forming conveyor may be given a rolling action so that the relatively hard edible substances constituting said bed may be brought into adherence with all of the outer surfaces of said bodies. Upon being delivered to the transverse belt 33, the nut coated candies may then be transferred to a final coating machine which is in effect a duplicate of the unit indicated at 1. The use of this final coating machine or unit is however optional.

What is claimed is:

In a confection producing machine, a primary conveyor having a discharge end, a secondary conveyor having a receiving end located materially below the discharge end of said primary conveyor, the discharge end of the primary conveyor being in overlapping relation to the receiving end of the secondary conveyor, and means for depositing nuts onto the secondary conveyor, said nut depositing means being located between the overlapped portions of the conveyors and at the receiving end of the secondary conveyor, whereby confections discharged from the primary conveyor fall through space onto nuts located on the secondary conveyor.

JOHN S. TRUESDELL.

Patent No. 2,115,969                              Granted May 3, 1938

JOHN S. TRUESDELL

The above entitled patent was extended June 5, 1951, for 5 years and 55 days from the expiration of the original term thereof.

*Commissioner of Patents.*